United States Patent
Cramer et al.

[15] 3,693,653
[45] Sept. 26, 1972

[54] FLUID MIXING REGULATOR

[72] Inventors: Robert L. Cramer; John W. Henneman; Jack E. Dunbar, all of P.O. Box 4508, Davenport, Iowa 52808

[22] Filed: Jan. 29, 1971

[21] Appl. No.: 110,955

[52] U.S. Cl. ............... 137/557, 137/607, 137/613, 137/625.4, 137/494, 137/98, 128/147, 128/209
[51] Int. Cl. ............................................. F16k 37/00
[58] Field of Search ..... 137/98, 607, 613, 625.4, 557, 137/494; 128/147

[56] References Cited

UNITED STATES PATENTS

| | | | |
|---|---|---|---|
| 1,763,305 | 6/1930 | Heidbrink | 137/98 X |
| 2,702,561 | 2/1955 | Geffroy | 137/98 |
| 3,221,757 | 12/1965 | Newton | 137/98 |
| 3,231,249 | 1/1966 | Kalert | 137/494 X |
| 1,979,611 | 11/1934 | Forbes | 137/625.4 |
| 3,225,784 | 12/1965 | Call | 137/557 X |

*Primary Examiner*—Harold W. Weakley
*Attorney*—William N. Antonis and Plante, Hartz, Smith & Thompson

[57] ABSTRACT

A control mechanism for regulating the amount of fluid from a first and second supply source to an outlet. The fluid from the first source is transmitted to a first chamber having a valve mechanism controlled by a diaphragm whereas the fluid from the second source is transmitted to a second chamber having an identical valve mechanism controlled by an identical diaphragm. A control mechanism transmits the same fluid pressure to one side of the first diaphragm and to one side of the second diaphragm. Any pressure differential across the respective diaphragm members will operate the valve mechanisms simultaneously to transmit the fluids from the first and second supply sources to a flow chamber from whence the mixture can travel through an outlet in a predetermined ratio to a receiving apparatus.

11 Claims, 6 Drawing Figures

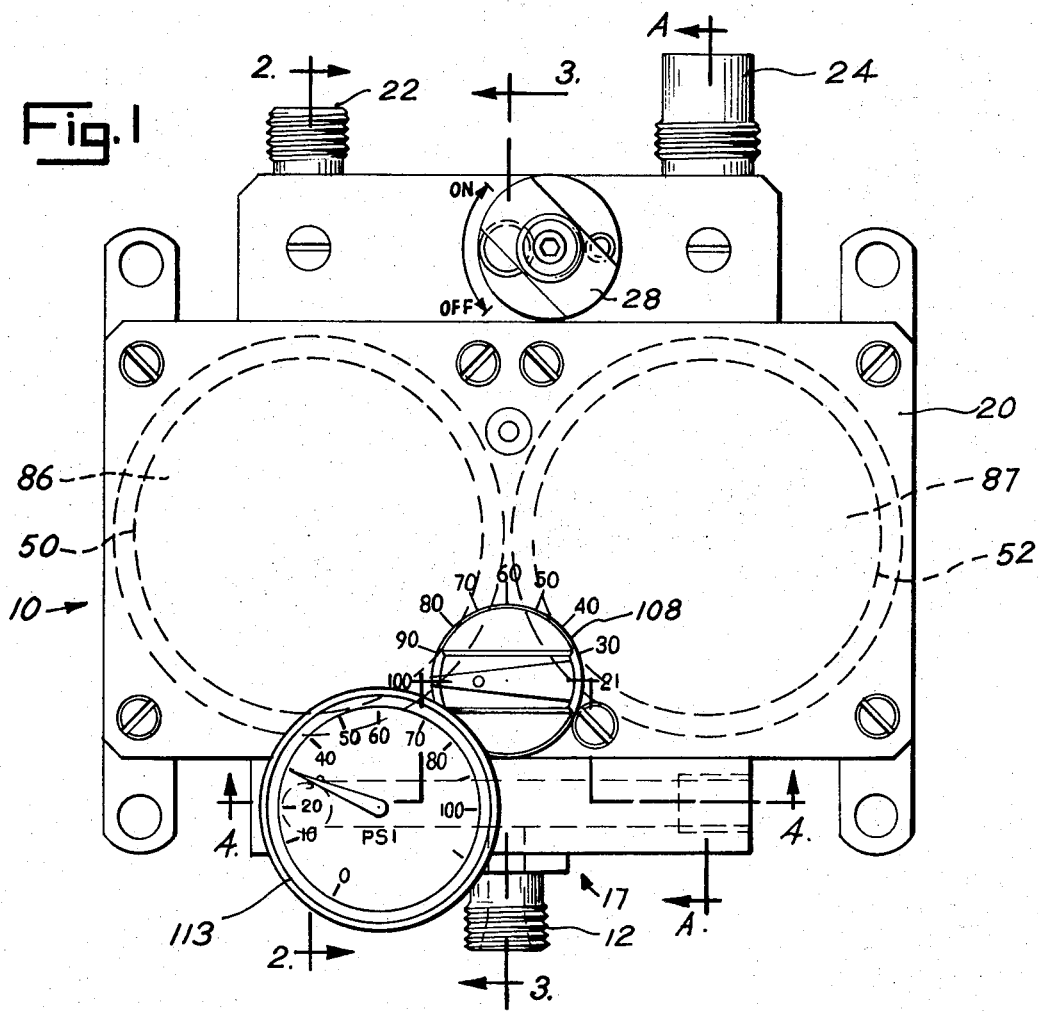
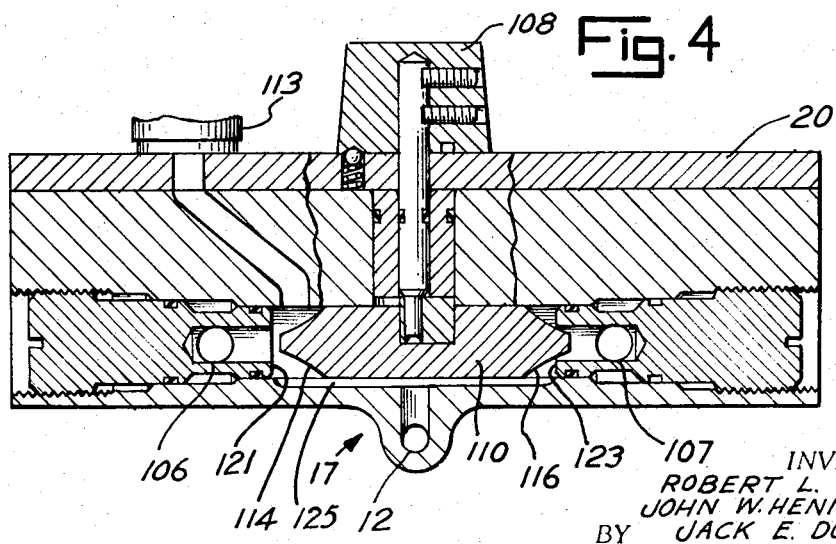
INVENTORS
ROBERT L. CRAMER,
JOHN W. HENNEMAN &
JACK E. DUNBAR
BY Plante, Hartz, Smith & Thompson
ATTORNEYS

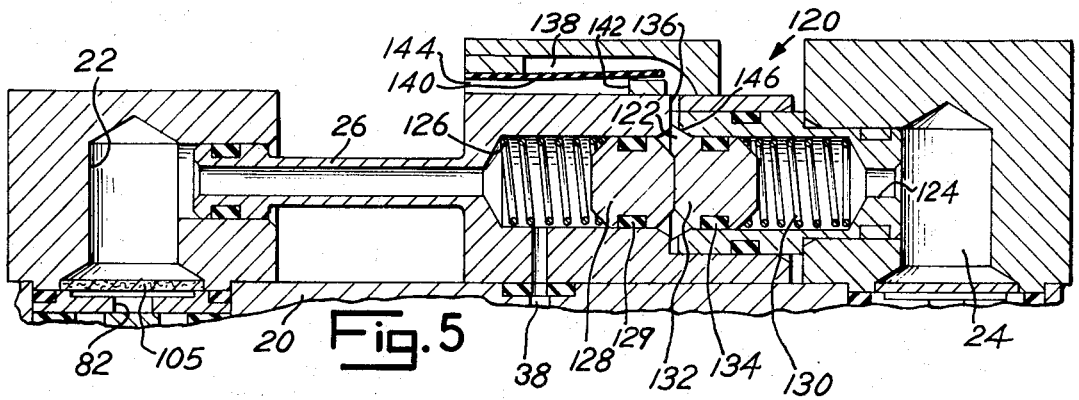
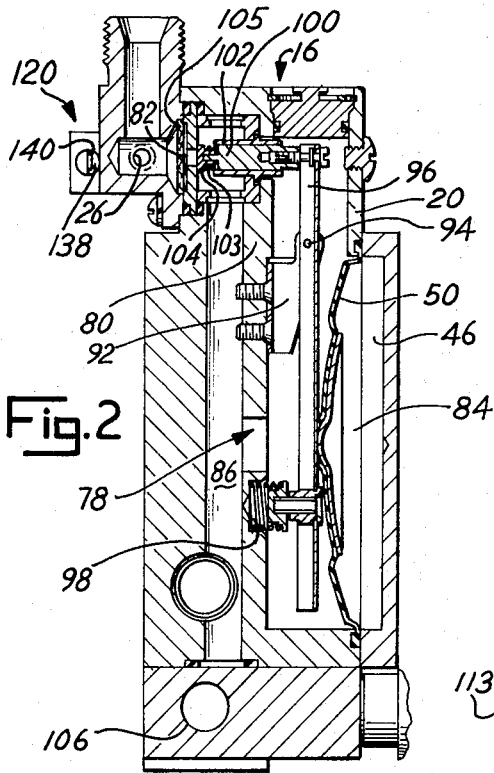
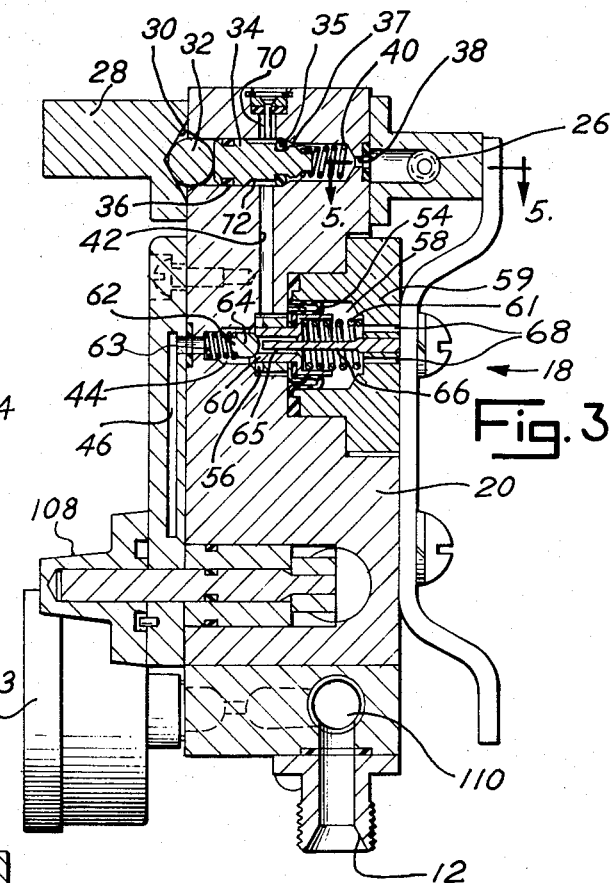
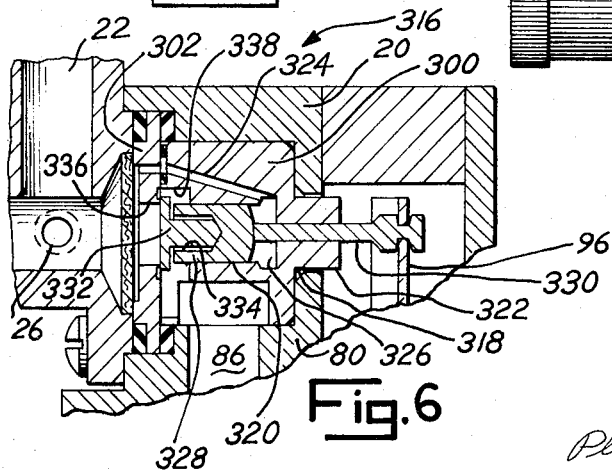
INVENTORS
ROBERT L. CRAMER,
JOHN W. HENNEMAN &
JACK E. DUNBAR
BY Plante, Hartz, Smith & Thompson
ATTORNEYS 3,693,653

FLUID MIXING REGULATOR

BACKGROUND OF THE INVENTION

With the use of current inhalation therapeutic equipment, when it is desired to mix two fluids, it is necessary that each fluid be maintained at a pressure range of 50 to 70 psi. Each fluid is sent through a flowmeter to adjust the flow out of each to correspond to the proportion of mixing required. This is sufficient if a constant flow is desired; but where you have a sinusoidal flow caused by normal breathing, the flow rate will vary. As a result, the mixing is not constant. In addition with each change in flow pressure from each source, we have a different mixture produced, thus the control for the output is very unsatisfactory.

It is known to provide a valve within a single structure for controlling two functions. These valves are designed so that one part of the valve will remain open at low pressures, another part of the valve will remain open for an intermediate range of pressures and all parts of the valve will be opened at high pressures. In order to precisely open these valves, the spring mechanisms which operate the closures of the various parts of the valves must be relatively strong and uniform. Since the possibility of obtaining two springs which are exactly alike is very remote in combining a plurality of these valves in a single structure, complete uniformity in operation is unlikely.

It is also known to provide a controller for mixing two gases from essentially equal supply pressures, and allowing for an appreciable pressure drop within the unit for accurate control. Both of these limitations can cause serious limitations on the applicability of the device to hospital therapy equipment.

SUMMARY OF THE INVENTION

In order to overcome the disadvantages of the prior art, we have provided a fluid regulating apparatus for use with hospital inhalation therapy equipment, having means for accurately and precisely mixing two separate fluids going to a receiving apparatus in a predetermined ratio. Through our regulating apparatus each gaseous fluid under pressure is mixed and delivered to the inhalation therapy devices whether the outlet flow be steady state or irregular in nature. To accomplish this result, two identical regulating valve mechanisms, one for the first fluid and one for the second fluid, are simultaneously operated by a single control means. Each of the valve mechanisms is connected to a control chamber which is directly controlled by the fluid pressure from one of the sources of fluid. Movable wall means separate the control chamber from a flow chamber for each of the fluids. Proportioning means are provided adjacent the outlet to precisely mix the fluids in the desired ratio. As the fluid is drawn from the outlet, a pressure differential is created across the movable wall members in each of the fluid flow paths. Since the pressure differential across each diaphragm member will be the same, the valves for controlling flow of the first and second fluids will operate simultaneously and open with precision. The valves will regulate the flow of these fluids to their respective control chambers in the exact ratio with respect to the downstream pressure at the outlet port. In the event of malfunction and consequent reduction or loss of fluid pressure from either of the sources of fluid, the device will automatically modify the outlet flow or shut-off and give an audible warning to an operator to correct the malfunction.

It is therefore the object of this invention to provide a fluid regulating device for mixing a plurality of fluids in a predetermined constant ratio supplied to an outlet.

It is still another object of the invention to provide a fluid mixing apparatus for a plurality of fluids having means to simultaneously operate the valves controlling the flow of fluids to a mixing chamber.

It is still another object of the invention to provide a fluid mixing apparatus for precisely and accurately proportioning the flow of fluid to an outlet in a maintained predetermined ratio.

It is still a further object of the invention to provide a fluid regulating apparatus having means to automatically give an audible warning if the fluid outlet pressure falls below a predetermined value.

These and other objects will become readily apparent to those who view the drawings and read the specification.

BRIEF DESCRIPTION OF THE DRAWINGS

FIG. 1 is a plan view of the fluid regulating apparatus constructed in accordance with the principles of our invention;

FIG. 2 is a sectional view taken along line 2—2 of FIG. 1 showing the diaphragm operated valve mechanism of our invention;

FIG. 3 is a sectional view taken along line 3—3 of FIG. 1 showing the control means for operating the valve mechanism of FIG. 2;

FIG. 4 is a sectional view taken along line 4—4 of FIG. 1 showing a deproportioning means for controlling the fluid flow to an outlet port;

FIG. 5 is a sectional view taken substantially along line 5—5 of FIG. 3 showing the audible warning device for use with the fluid regulating device; and FIG. 6 is a sectional view of a balanced valve operated by a diaphragm for controlling fluid flow from a source.

DETAILED DESCRIPTION OF THE PREFERRED EMBODIMENT

In the fluid control apparatus 10, as shown in FIG. 1, two separate fluids under pressure are brought to a single outlet port 12 where proportioning means 17 controls the flow of fluid to a therapeutic inhalation apparatus (not shown). The flow through the regulating apparatus of the individual fluids is controlled by valve means 16, as shown in FIG. 2, which is responsive to the control means 18, as shown in FIG. 3, for accurately providing fluid to the outlet port 12 where proportioning means 17 delivers a precise percentage of the fluid mixture desired by the operator to the inhalation apparatus.

In more particular detail, the fluid regulating apparatus 10 shown in FIG. 1, consists of a housing 20 having a first inlet port 22 and a second inlet port 24, the inlet port 22 being connected to the control means 18 by conduit 26, as shown in FIGS. 3 and 5.

The control means 18 located in housing 20 consists of a positioning knob 28 having a detent 30 which controls the location of a ball 32 which slidably moves an O-ring sealed piston 34 in a bore 36 adjacent the jeweled opening 38 connected to the conduit 26. The slidable piston 34 is urged against the ball 32 by spring means 40 abutting the jeweled opening 38. In the position shown in FIG. 3, fluid pressure can freely pass the O-ring 35 on the piston 34 to conduit 42 in communication with metering chamber 44. The metering chamber 44 is in turn connected by slotted passageway 46 to the individual diaphragm members 50 and 52 of the valve operating mechanism 16.

Referring to FIG. 3 it will be seen that located in the metering chamber 44 is a diaphragm member 54 which separates the metering chamber into a fluid pressure chamber 56 and an atmospheric chamber 58. A seating member 60 is secured to the diaphragm member 54 on the side of fluid pressure chamber 56. A resilient member 61 abuts the inner surface of cap 59 retained in housing 20 and projects against the diaphragm member 54 to urge seat member 60 against a slidable ball mechanism 64 carried in the housing 20. A resilient member 63 surrounds shaft 62 of the ball mechanism 64 to urge it against the seat 60. A stem member 66 attached to cap 59 centrally projects into opening 65 to provide a guide surface for seat member 60. In addition, the stem member 66 limits the axial movement of ball mechanism 64 in the fluid pressure chamber 56. Ambient ports 68 are radially spaced around stem 66 to permit atmospheric pressure to a flow path chamber 58.

Downstream from the jeweled opening 38, an atmospheric opening 70 is provided adjacent an annulus 72 on the slidable member 34. Opening 70 will provide an outlet for the internal fluid pressure, when the O-ring seal prevents fluid flow passage through inlet 38, to bring the pressure across the movable walls or diaphragms 50 and 52 into equilibrium.

When the control member 28 is placed in the ON position, as shown in FIG. 1, fluid pressure from inlet 22 is communicated through the conduit 26 through jeweled opening 38 into fluid pressure chamber 56 into passage 46 to the first and second control chambers 84 (only the first chamber being shown in FIG. 2) to operate the valve control means 16.

The valve control means 16 for the separate inlet ports 22 and 24 are identical and therefore the section 2—2 through inlet port 22 will be fully described although the description would be equally applicable to section A—A as shown cut through inlet port 24 in FIG. 1.

The valve control means 16, as shown in FIG. 2, consists of a cavity 78 in the housing 20 having an internal bearing wall 80. Along the internal wall is connected a movable wall or diaphragm member 50, the diaphragm member 50 divides the cavity 78 into a control chamber 84 and a fluid flow chamber 86. A support member 92 for the control valve means 16 is connected to the bearing wall 80. A lever arm 96 is pivotally located on the support member 92 by pivot pin 94.

A resilient member 98 is carried on lever arm 96 opposite the movable wall or diaphragm member 50. The resilient member 98 is connected to the bearing wall 80 and keeps the lever arm 96 abutting the diaphragm member 50. On the other end of the lever arm 96 is a slidable piston member 100 which is retained in sleeve 102 carried by the bearing wall 80. Along one end of the slidable piston member 100 is a seal member 104 biased by spring member 103 into seating engagement with the opening 82 to control fluid flow from inlet port 22. Adjacent the opening 82 is a filter mechanism 105 which prevents any solid impurities from entering into the fluid flow chamber 86.

Fluid under pressure from the first and second sources communicated to the first and second flow chambers 86 and 87, respectively, in response to the control means 18 moving valve means 16 will be directed through conduits 106 and 107, as shown in FIG. 4, to the mixing chamber 125 of the proportioning means 17. The dial means 108 positions the two-faced valve mechanism 110 into the correct percentage of gas which will be taken from the respective flows to correctly distribute to the outlet port 12.

The slidable valve 110 has its faces 114 and 116 machined to correspond to the percentages as shown on dial 108 by cooperating with valve faces 121 and 123, respectively, to correctly proportion the amount of gas flowing from the first flow chamber 86 and second flow chamber 87 through the outlet port 12 of the mixing chamber 125. The outlet port 12 in turn is connected to a gauge 113 shown in FIG. 1 of a known type which will correctly give the pressure at which the outlet pressure is to be received by the therapeutic inhalation apparatus (not shown).

MODE OF OPERATION OF THE PREFERRED EMBODIMENT

When the control apparatus 28 is turned into the ON position, ball 32 will slide back into detent 30. When this occurs, the movable cylindrical piston member 34 is pushed back by spring 40 and the O-ring 35 is moved away from seat 37. Fluid pressure from the first source of fluid is then communicated by conduit 26 past jeweled opening 38 through conduit 42 and thence to the slotted connection 46. With pressure in the control chambers 84 acting on diaphragm members 50 and 52, a pressure differential between the control chambers 84 and the first and second fluid flow chambers 86 and 87, respectively, will exist. The differential pressure across the movable diaphragm members 50 and 52 will exist until such time as it overcomes resilient spring member 98. As the diaphragm members 50 and 52 compress the resilient spring members 98, the lever rods 96 will pivot on support members 94. Movement of the lever rods 96 will cause slidable piston member 100 to move in sleeve 102 to permit the first fluid under pressure to overcome spring 103 and unseat seal member 104 to allow the first and second fluids under pressure to come into the flow control chambers 86 and 87. Flow will continue to come into the control chambers 86 and 87 until such time as the forces across the diaphragm members 50 and 52 are equalized, when lever arm 96 will be moved by spring 98 to again move seal member 104 to regulate flow through inlet 82.

The flow of fluid pressure through inlet 38 will continue until such time as the pressure in the control chambers 84 reaches a predetermined value.

This predetermined pressure on the diaphragm member 54 will cause a pressure differential to compress resilient member 61. With resilient member 61 compressed, the diaphragm member 54 will move to the right, as shown in FIG. 3. When this occurs, the slidable ball member 64 will track the diaphragm member 54 until the ball contacts the stem member 66. The seat mechanism 60 will now move away from the ball member 64 permitting the excess pressure to pass into the atmospheric chamber 58 and out through ambient ports 68. Through the resiliently biased ball member 64 it is possible to accurately control the pressure reaching diaphragm members 50 and 52 in order to maintain a balanced flow from the first and second fluid sources.

When 100 percent oxygen is desired, the dial member 108 will position the valve 110, as shown in FIG. 4. All the flow will pass from the first flow control chamber 86 through conduit 106 past the slidable valve mechanism 110 and out through outlet port 12. When a smaller percentage than 100 percent of oxygen or any other fluid is desired, dial member 108 will be positioned to the proper mixture. In this position the sources of fluid would be proportioned to flow around valve seats 121 and 123 and faces 114 and 116 into mixing chamber 123 before reaching outlet port 12.

With displacement of fluid through the outlet port 12, the pressure differential across the movable wall members 50 and 52 will accurately and precisely control the valve mechanism 16 to simultaneously control flow from the first and second fluid sources to the first and second fluid flow chambers 86 and 87 as a function of the proportioned flow.

When the positioning knob 28 of the control means 18 is turned to the OFF position, the O-ring seal surrounding piston 34 is moved down into chamber 36. With the fluid pressure flow from conduits 26 through opening 38 obstructed, the small opening 70 will permit the fluid pressure remaining in control chamber 84 to bleed back to ambient. Without pressure in chamber 84 to overcome resilient members 98 the seat member 104 carried by the slidable piston member 100 will remain seated to completely shut off the flow from the first and second fluid sources to their respective flow chambers 86 and 87.

Connected to the inlet port 22 which receives the first source of fluid under pressure is an audible warning device 120. The warning device 120 has a flow chamber 122 with one end connected to conduit 26 and the other end connected to the outlet port 24 through passage 124. A first resilient member 126 abuts the internal face of the flow chamber adjacent the end connected to conduit 26 to act on a first piston 128 sealed by O-ring 129 in flow chamber 122. A second resilient member 130 abuts the internal face of the flow chamber adjacent the end connection to passage 124 to act on a second piston 132 sealed by O-ring 134 in flow chamber 122. Resilient members 126 and 130 urge the first and second piston members 128 and 132 respectively, into an abutting relationship at the center of the flow chamber 122 when the pressure of the fluid transmitted through the inlet ports 22 and 24 are equal. At the center of the flow chamber 122 is an opening 136 which expands into a sound cavity 138. A reed 140 located in the sound cavity 138 is positioned between a lip 142 and an opening 144 to the atmosphere.

Normally, during operational periods, fluid will flow through conduit 26 through flow chamber 122 and into jeweled opening 38 to operate the pressure loaded diaphragms 50 and 52 controlling the flow in a relationship as set by the operator on control 108. If the fluid flow received by either inlet port 22 or 24 falls below a predetermined value, as represented by the strength of resilient member 126 and 130 an audible warning will be given to alert the operator. This occurs by either resilient member 126 or 130 moving either piston 128 or 132 past the opening 136 which will permit fluid to flow out into the sound chamber and past the reed 140. As the fluid flows past reed 140, vibrations will be set which will make a distinguishable sound to inform the operator of a malfunction in the operation of the fluid control apparatus 10.

If the second source of fluid is diminished, then 100 percent of the first fluid is carried to the outlet 12 at a somewhat lesser delivery pressure since the pressure loaded valves are controlled by the first source of fluid. However, if the first source of fluid is diminished, then the unit will shut off, since the control valve means 16 will not open. The face 146 of the flow chamber 122 adjacent opening 136 is so designed that if the fluid flow is from the second source, a more intense sound will be created to immediately alert the operator that the first source of fluid has been used up.

The control valve means 316, shown in FIG. 6, is designed to be interchangeable with the control valve means 16 of the fluid control apparatus 10 described above with reference to FIGS. 1 and 2. The control valve means 316 includes a bearing member 320 having an annular projection 322 which fits into an opening 318 located in bearing wall 80. A stepped bore 320 centrally located in the annular projection 322 extends through the bearing member 300. A washer type cap 302 secured to housing 20 retains bearing member 300 against the wall 80. A passage 324 connects inlet port 22 with an enlarged portion 326 of the stepped bore 320. A piston member 328 is located in the enlarged portion 326 of the stepped bore 320 while an attached stem member 330 is slidably retained in the annular projection 322 of the bearing member 300. The stem member 330 is in turn secured to the lever arm 96. A seal member 332 located in a bore 334 within the piston member 328 has a face with a diameter greater than the opening 336 in the washer type cap 302.

In the closed position as the control valve means 316 is shown in FIG. 6, the same fluid pressure present at inlet 22 acting on seal member 332 is communicated through passage 324 to the back side of the piston member 328. Thus, in positioning the lever to move the face seal member 332 against surface of the washer type cap 302 surrounding the opening, the resilient member 98 need only overcome the force across the diaphragm member 50 since the pressure on both sides of the piston member are balanced. Correspondingly, in opening the control valve means 316 is now dependent upon the relationship of the diaphragm member 50 and the resilient member 98. As the pressure across the diaphragm member increases, resilient member 98 is compressed moving lever 96 about pivot pin 94. As the lever 96 pivots about pivot pin 94, stem 322 slides to the right, as viewed in FIG. 6, the pressure on the face of the seal member 332 will cause it to follow the piston permitting fluid to flow through the opening 336 past annular space 338 and into the flow chamber 86 to be proportioned to the recipient in the desired ratio in the same manner as described above.

The valve means 16 being pressure opened, automatically acts as reverse flow check valves to prevent back flow pressure from the first source to the second source, if air pressure is absent or not connected.

It would be considered obvious to one of ordinary skill in the art to make the design above to operate with a plurality of gases, each controlled by the same first source of fluid to simultaneously operate a valve mechanism controlling the inflow of the source of gas to an outlet port in proportion to the desired mixture.

We claim:

1. A fluid regulating apparatus, comprising:

a housing having a first chamber and a second chamber, said first chamber being connected to a first source of fluid under pressure through a first inlet port, said second chamber being connected to a second source of fluid under pressure through a second inlet port;

first movable means for dividing said first chamber into a first flow chamber and a first control chamber;

first valve means operatively connected to said first inlet port being responsive to movement of said first movable means for controlling the flow of said first source of fluid to said first flow chamber, said first valve means having a first lever arm pivotally attached to said housing a distance from a first end, the other end of said first lever arm abutting said first movable means, said first lever arm having a first closure member attached to said first end adjacent first inlet port, said first valve means having a first resilient means connected to said first lever arm for urging said first closure member against a seat around said first inlet port until the pressure differential across said first movable means is sufficient to move said other end of said first lever and thereby overcome said first resilient means permitting said first source of fluid to flow through said first inlet port;

second movable means for dividing said second chamber into a second flow chamber and a second control chamber;

second valve means operatively connected to said second inlet port being responsive to movement of said second movable means for controlling the flow of said second source of fluid to said second flow chamber, said second valve means having a second lever arm pivotally attached to said housing a distance from a second end, the other end of said second lever arm abutting said second movable means, said second lever arm having a closure member attached to said second end adjacent said second inlet port, said second valve means having a second resilient means connected to said second lever arm for urging said second closure member against a seat around said second inlet port until the pressure differential across said second movable means is sufficient to move said other end of said second lever and thereby overcome said second resilient means permitting said second source of fluid to flow through said second inlet port;

proportioning means for controlling fluid flow from said first flow chamber and said second flow chamber to an outlet port in the housing in a predetermined ratio through first conduit means connecting said first flow chamber and said second flow chamber to said outlet port, said proportioning means having a two faced valve member slidable in said first conduit means;

dial means for positioning said two faced valve to control the percentage of said first source of fluid under pressure and said second source of fluid under pressure being received by said outlet port;

control means for maintaining an equal fluid pressure in said first control chamber and said second control chamber for generating a pressure differential across said first movable means and said second movable means causing said first valve means and said second valve means to operate simultaneously, said control means having a second conduit means connected to said first source of fluid under pressure with valve means located in said second conduit means for controlling the flow of said first source of fluid to a metering chamber, said steering chamber being connected to said first control chamber and said second control chamber;

a diaphragm member dividing said metering chamber into a fluid pressure chamber and an atmospheric chamber;

a seat member surrounding an opening in said diaphragm; and a resilient member urging said seat against a ball member to seat said fluid pressure chamber until a predetermined pressure is reached.

2. The fluid regulating apparatus, as recited in claim 1, wherein any excess fluid pressure above said predetermined pressure will overcome said resilient member causing said seat to move away from said ball permitting said excess fluid pressure to escape to said atmospheric chamber through said opening in said diaphragm and thereby maintain the predetermined pressure in said fluid pressure chamber.

3. The fluid regulating apparatus, as recited in claim 2, including:

a shaft attached to said ball member;

a resilient member surrounding said shaft for urging said ball against said seat; and a stem member centrally located in said opening of said diaphragm for limiting the distance said resilient member will move said ball member when said seat member moves.

4. The fluid regulating apparatus, as recited in claim 3, wherein said second conduit means has an atmospheric opening downstream from said valve means for permitting the fluid pressure in said first and second control chambers to escape to the atmosphere when said valve means prevents fluid flow from said first source and thereby equalize the pressure across said first and second movable means.

5. The fluid regulating apparatus, as recited in claim 1, including:

signal means located adjacent said outlet port for giving an audible warning during periods of fluid pressure operation received from said first and second flow chambers.

6. A fluid regulator for delivering a preset fluid mixture to a sinusoidal fluid flow demand apparatus, said regulator comprising:

a housing having a first chamber, a second chamber and a third chamber, said first chamber being connected to a first source of fluid under pressure through a first inlet port, said second chamber being connected to a second source of fluid under pressure through a second inlet port, said third chamber being connected to said first and second chambers, said third chamber being connected to said sinusoidal fluid flow demand apparatus through an outlet port;

first movable means for dividing said first chamber into a first flow chamber and a first control chamber;

first valve means operatively connected to said first inlet port being responsive to movement of said first movable means for controlling the flow of said first source of fluid through said first flow chamber into said third chamber;

second movable means for dividing said second chamber into a second flow chamber and a second control chamber;

second valve means operatively connected to said second inlet port being responsive to movement of said second movable means for controlling the flow of said second source of fluid through said second flow chamber into said third chamber;

control means through which an operational fluid is supplied to said first control chamber and second control chamber;

relief valve means associated with said control means for maintaining said operational fluid pressure within a predetermined pressure range to provide substantially equal fluid pressures in the first and second control chambers; and proportioning means located in said third chamber for controlling the fluid flow of a predetermined mixture of the first and second fluid through said outlet port in response to a sinusoidal flow demand, said sinusoidal flow demand creating corresponding pressure differentials across the first and second movable means, said pressure differentials causing the first and second valve means to operate simultaneously and permit the first source of fluid and the second source of fluid to flow with substantially equal pressures into the third chamber until said pressure differential is eliminated as a function of the sinusoidal flow demand.

7. The fluid regulator, as recited in claim 6, wherein said relief valve means includes:
  a housing having a metering chamber therein;
  a diaphragm member dividing said metering chamber into a fluid pressure chamber and an atmospheric chamber, said fluid pressure chamber being connected to said control means and said first and second control chambers;
  a seat member surrounding an opening in said diaphragm; and
  a resilient member urging said seat against a ball member to seat said fluid pressure chamber until said predetermined pressure range is reached.

8. The fluid regulator, as recited in claim 7, wherein any excess fluid pressure above said predetermined pressure range will overcome said resilient member causing said seat to move away from said ball permitting said excess fluid pressure to escape to said atmospheric chamber through said opening in said diaphragm and thereby maintain the predetermined pressure range in said fluid pressure chamber.

9. The fluid regulator, as recited in claim 8, wherein said first valve means includes:
  a lever arm pivotally attached to said housing a distance from a first end, the other end of said lever arm abutting said first movable means;
  a closure member attached to said first end adjacent said first inlet port; and
  resilient means connected to said lever arm for urging said closure member against a seat around said first inlet port until the pressure differential across said first movable means is sufficient to move said other end of said lever and thereby overcome said resilient means permitting said first source of fluid to flow through said first inlet port.

10. The fluid regulator, as recited in claim 9, wherein said second valve means includes:
  a lever arm pivotally attached to said housing a distance from a second end, the other end of said lever arm abutting said second movable means;
  a closure member attached to said second end adjacent said second inlet port; and
  resilient means connected to said lever arm for urging said closure member against a seat around said second inlet port until the pressure differential across said second movable means is sufficient to move said other end of said lever and thereby overcome said resilient means permitting said second source of fluid to flow through said second inlet port.

11. The fluid regulator, as recited in claim 10, wherein said proportioning means includes:
  first conduit means connecting said first flow chamber and said second flow chamber to said outlet port;
  a two faced valve member slidable in said first conduit means; and
  dial means for positioning said two faced valve to control the percentage of said first source of fluid under pressure and said second source of fluid under pressure being received by said outlet.

* * * * *